(12) United States Patent
Hellestam

(10) Patent No.: US 9,676,032 B2
(45) Date of Patent: *Jun. 13, 2017

(54) METHOD FOR ADDITIVE MANUFACTURING

(71) Applicant: Arcam AB, Moelndal (SE)

(72) Inventor: Calle Hellestam, Goeteborg (SE)

(73) Assignee: Arcam AB, Moelndal (SE)

( * ) Notice: Subject to any disclaimer, the term of this patent is extended or adjusted under 35 U.S.C. 154(b) by 374 days.

This patent is subject to a terminal disclaimer.

(21) Appl. No.: 14/452,294

(22) Filed: Aug. 5, 2014

(65) Prior Publication Data

US 2015/0086409 A1 Mar. 26, 2015

Related U.S. Application Data

(60) Provisional application No. 61/880,555, filed on Sep. 20, 2013.

(51) Int. Cl.
*B22F 3/10* (2006.01)
*B29C 67/00* (2017.01)
(Continued)

(52) U.S. Cl.
CPC ........ *B22F 3/1055* (2013.01); *B29C 67/0077* (2013.01); *B33Y 10/00* (2014.12);
(Continued)

(58) Field of Classification Search
None
See application file for complete search history.

(56) References Cited

U.S. PATENT DOCUMENTS 2,264,968 A  12/1941  De Forest
2,323,715 A   7/1943  Kuehni
(Continued)

FOREIGN PATENT DOCUMENTS

CA    2860188 A1    6/2006
CN  101607311 A   12/2009
(Continued)

OTHER PUBLICATIONS

Machine translation into Englishof WO 2008074287 provided via EPO Patent Translate, pp. 1-13, printed Nov. 2, 2016.*

(Continued)

*Primary Examiner* — Colleen Dunn
(74) *Attorney, Agent, or Firm* — Alston & Bird LLP

(57) ABSTRACT

A method for forming a three-dimensional article comprising applying a first powder layer on a work table; directing a first energy causing said first powder layer to fuse in first selected locations to form a first cross section where said first energy beam is fusing a first region with parallel scan lines in a first direction and a second region with parallel scan lines in a second direction; fusing at least one of the scan lines in said first region in said first direction immediately before fusing at least one of said scan lines in said second region in said second direction; applying a second powder layer and directing the energy beam causing said second powder layer to fuse in second selected locations where the energy beam is fusing said first region with parallel scan lines in a third direction and said second region in a fourth direction.

21 Claims, 6 Drawing Sheets

(51) Int. Cl.
  *B22F 3/105* (2006.01)
  *G05B 19/4099* (2006.01)
  *B33Y 10/00* (2015.01)
  *B28B 1/00* (2006.01)
  *B29K 105/00* (2006.01)

(52) U.S. Cl.
  CPC .. *G05B 19/4099* (2013.01); *B22F 2003/1056* (2013.01); *B28B 1/001* (2013.01); *B29C 67/0088* (2013.01); *B29K 2105/251* (2013.01); *G05B 2219/49023* (2013.01); *Y02P 10/295* (2015.11)

(56) References Cited

U.S. PATENT DOCUMENTS

| | | | |
|---|---|---|---|
| 3,882,477 A | 5/1975 | Mueller | |
| 4,348,576 A | 9/1982 | Anderl et al. | |
| 4,352,565 A | 10/1982 | Rowe et al. | |
| 4,401,719 A | 8/1983 | Kobayashi et al. | |
| 4,818,562 A | 4/1989 | Arcella et al. | |
| 4,863,538 A | 9/1989 | Deckard | |
| 4,888,490 A | 12/1989 | Bass et al. | |
| 4,927,992 A | 5/1990 | Whitlow et al. | |
| 4,988,844 A | 1/1991 | Dietrich et al. | |
| 5,118,192 A | 6/1992 | Chen et al. | |
| 5,135,695 A | 8/1992 | Marcus | |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,511,103 A | 4/1996 | Hasegawa | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,537,722 B2 | 5/2009 | Andersson et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 9,505,172 B2 | 11/2016 | Ljungblad | |
| 9,550,207 B2 | 1/2017 | Ackelid | |
| 2002/0104973 A1 | 8/2002 | Kerekes | |
| 2002/0152002 A1 | 10/2002 | Lindemann et al. | |
| 2002/0195747 A1 | 12/2002 | Hull et al. | |
| 2003/0133822 A1 | 7/2003 | Harryson | |
| 2003/0205851 A1 | 11/2003 | Laschutza et al. | |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1 | 9/2004 | Srinivasan | |
| 2004/0173946 A1 | 9/2004 | Pfeifer et al. | |
| 2004/0217095 A1 | 11/2004 | Herzog | |
| 2005/0173380 A1 | 8/2005 | Carbone | |
| 2005/0186538 A1* | 8/2005 | Uckelmann | A61C 13/0004 433/201.1 |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0175875 A1* | 8/2007 | Uckelmann | A61C 13/0013 219/121.85 |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2010/0260410 A1 | 10/2010 | Taminger et al. | |
| 2010/0310404 A1 | 12/2010 | Ackelid | |
| 2010/0316856 A1 | 12/2010 | Currie et al. | |
| 2011/0133367 A1 | 6/2011 | Weidinger et al. | |
| 2011/0241575 A1 | 10/2011 | Caiafa et al. | |
| 2011/0293770 A1 | 12/2011 | Ackelid et al. | |
| 2011/0293771 A1* | 12/2011 | Oberhofer | B22F 3/1055 425/182 |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet et al. | |
| 2012/0183701 A1 | 7/2012 | Pilz et al. | |
| 2012/0193530 A1 | 8/2012 | Parker et al. | |
| 2012/0223059 A1 | 9/2012 | Ackelid | |
| 2012/0225210 A1 | 9/2012 | Fruth | |
| 2012/0266815 A1 | 10/2012 | Brunermer | |
| 2013/0055568 A1 | 3/2013 | Dusel et al. | |
| 2013/0186514 A1 | 7/2013 | Zhuang et al. | |
| 2013/0216959 A1 | 8/2013 | Tanaka et al. | |
| 2013/0264750 A1 | 10/2013 | Hofacker et al. | |
| 2013/0300286 A1 | 11/2013 | Ljungblad et al. | |
| 2013/0343947 A1 | 12/2013 | Satzger et al. | |
| 2014/0175708 A1 | 6/2014 | Echigo et al. | |
| 2014/0271964 A1 | 9/2014 | Roberts, IV et al. | |
| 2014/0301884 A1 | 10/2014 | Hellestam et al. | |
| 2014/0308153 A1 | 10/2014 | Ljungblad | |
| 2014/0314609 A1 | 10/2014 | Ljungblad et al. | |
| 2014/0314964 A1 | 10/2014 | Ackelid | |
| 2014/0348691 A1* | 11/2014 | Ljungblad | B22F 3/1017 419/53 |
| 2014/0363327 A1 | 12/2014 | Holcomb | |
| 2014/0367367 A1 | 12/2014 | Wood et al. | |
| 2015/0004045 A1 | 1/2015 | Ljungblad | |
| 2015/0071809 A1 | 3/2015 | Nordkvist et al. | |
| 2015/0088295 A1 | 3/2015 | Hellestam | |
| 2015/0139849 A1 | 5/2015 | Pialot, Jr. et al. | |
| 2015/0151490 A1 | 6/2015 | Jonasson et al. | |
| 2015/0165524 A1 | 6/2015 | Ljungblad et al. | |
| 2015/0165525 A1 | 6/2015 | Jonasson | |
| 2015/0174658 A1 | 6/2015 | Ljungblad | |
| 2015/0174695 A1 | 6/2015 | Elfstroem et al. | |
| 2015/0251249 A1 | 9/2015 | Fager | |
| 2015/0283610 A1 | 10/2015 | Ljungblad et al. | |
| 2015/0283613 A1 | 10/2015 | Backlund et al. | |
| 2015/0290710 A1 | 10/2015 | Ackelid | |
| 2015/0306819 A1 | 10/2015 | Ljungblad | |
| 2016/0052056 A1 | 2/2016 | Fager | |

(56) References Cited

U.S. PATENT DOCUMENTS

| | | |
|---|---|---|
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| FR | 2980380 A1 | 3/2013 |
| JP | 2003241394 A | 8/2003 |
| JP | 2003245981 | 9/2003 |
| JP | 2009006509 A | 1/2009 |
| SE | 524467 C2 | 8/2004 |
| WO | WO 93/08928 A1 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/142492 A1 | 9/2015 |

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

European Search Report dated Feb. 16, 2012, for corresponding Application No. EP07852089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Preliminary Report on Patentability, dated Nov. 27, 2009, of corresponding international application No. PCT/SE2007/001084.

International Search Report dated Apr. 9, 2010 for Application No. PCT/SE2009/050901.

International Search Report dated Sep. 17, 2008 for Application No. PCT/SE2008/000007.

International Search Report mailed Sep. 2, 2008 of corresponding international application No. PCT/SE2007/001084.

International Searching Authority (ISA), International Search Report and Written Opinion for International Application No. PCT/EP2012/076025, mailed May 17, 2013, 11 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

International Searching Authority, International Search Report for International Application No. PCT/SE2011/050093, mailed Oct. 20, 2011, 5 pages, The Swedish Patent and Registration Office, Sweden.

Weigel, Th., et al., "Design and Preparation of Polymeric Scaffolds for Tissue Engineering," Expert Rev. Med. Devices, 2006, pp. 835-851, vol. 3, No. 6, XP002691485.

(56) References Cited

OTHER PUBLICATIONS

Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/057470, mailed Jan. 24, 2013, 1 page, European Patent Office, The Netherlands.
International Searching Authority, International Search Report for International Application No. PCT/EP2012/058733, Mar. 5, 2013, 4 pages, European Patent Office, The Netherlands.
United States Patent and Trademark Office, Office Action for U.S. Appl. No. 14/452,308, Nov. 15, 2016, 24 pages, U.S.A.
United States Patent and Trademark Office, Office Action for U.S. Appl. No. 14/452,308, Nov. 28, 2016, 10 pages, U.S.A.
United States Patent and Trademark Office, Notice of Allowance for U.S. Appl. No. 14/452,308, Apr. 11, 2017, 8 pages, U.S.A.
United States Patent and Trademark Office, Office Action for U.S. Appl. No. 14/452,308, Feb. 28, 2017, 13 pages, U.S.A.

* cited by examiner

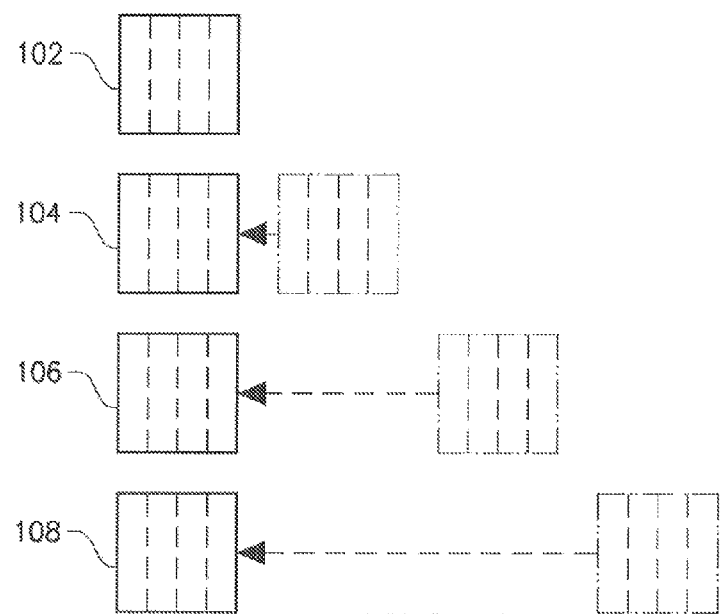
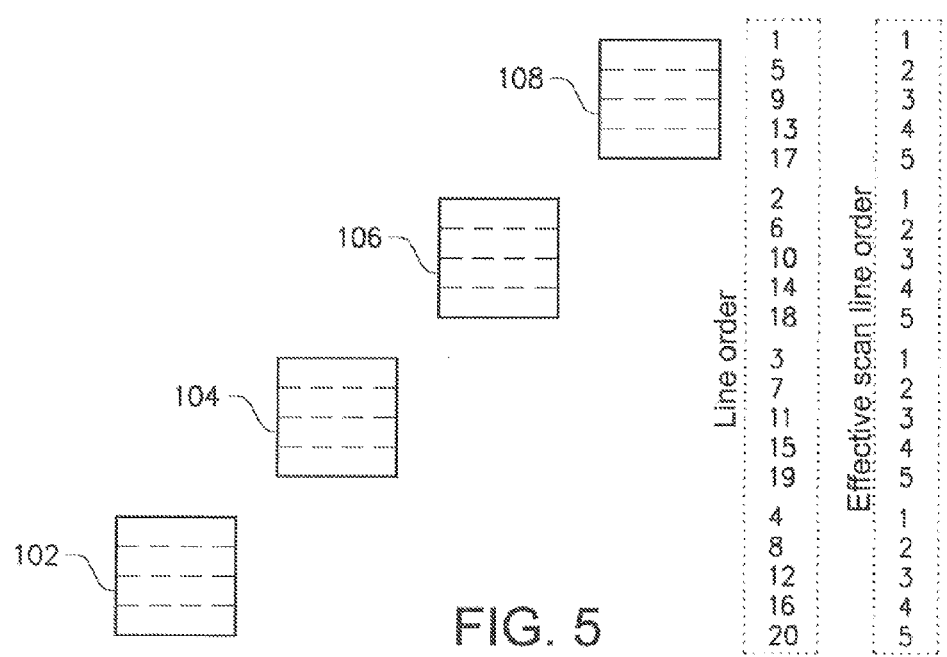
FIG. 4
FIG. 5

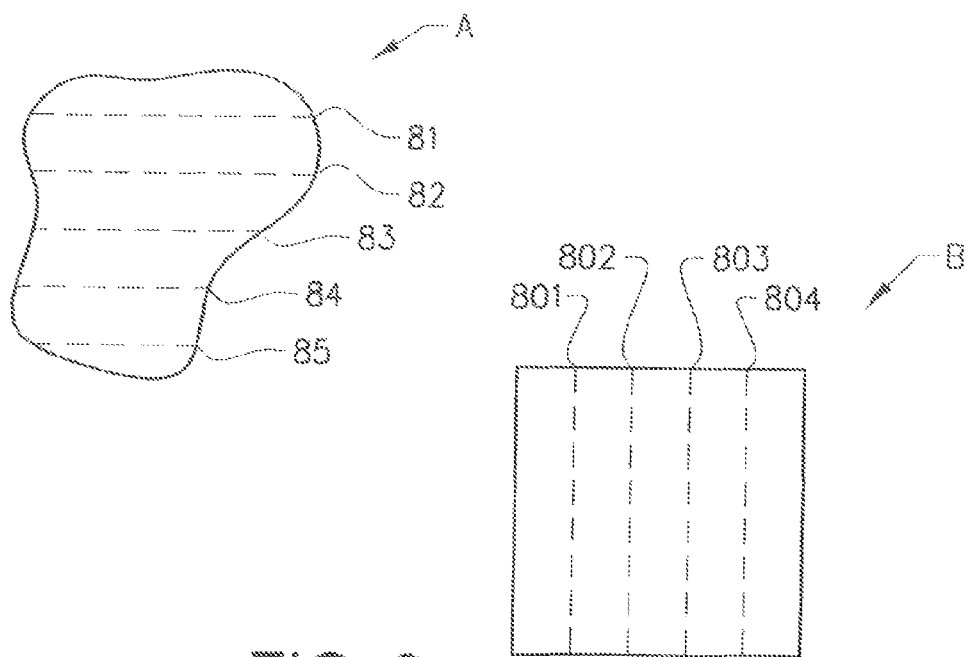
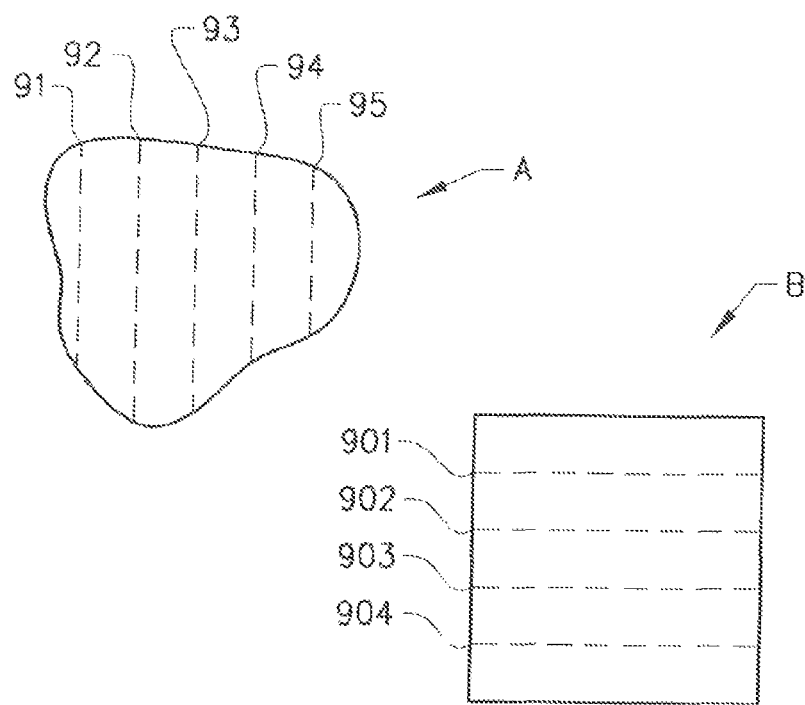
FIG. 8
FIG. 9

METHOD FOR ADDITIVE MANUFACTURING

CROSS-REFERENCE TO RELATED APPLICATIONS

This application claims priority to and the benefit of U.S. Provisional Patent Application Ser. No. 61/880,555, filed Sep. 20, 2013, the contents of which are hereby incorporated by reference in their entirety.

BACKGROUND

Technical Field

The present invention relates to a method for additive manufacturing of three-dimensional articles.

Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which the three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

There is a demand for additive manufacturing techniques which is capable of building three-dimensional articles faster and faster without sacrificing the material properties of the final product.

BRIEF SUMMARY

According to various embodiment, an article of the invention is to provide a method and apparatus which enables a fast production of three-dimensional articles by freeform fabrication or additive manufacturing without sacrificing the quality of the final product. The abovementioned article is achieved by the features in the method according to the claims provided herein.

In a first aspect according to various embodiments of the invention it is provided a method for forming at least two separate three-dimensional regions through successive fusion of parts of a powder bed, which parts correspond to successive cross sections of the three-dimensional regions. The method comprises the steps of: providing models of the three-dimensional regions, applying a first powder layer on a work table, directing a first energy beam from a first energy beam source over the work table causing the first powder layer to fuse in first selected locations according to corresponding models to form a first cross section of the three-dimensional regions, where the first energy beam is fusing a first region with parallel scan lines in a first direction and a second region with parallel scan lines in a second direction, fusing at least one of the scan lines in the first region in the first direction immediately before fusing at least one of the scan lines in the second region in the second direction, applying a second powder layer on the at least partially fused first powder layer, directing the energy beam over the work table causing the second powder layer to fuse in second selected locations according to corresponding models to form a second cross section of the three-dimensional regions, where the energy beam is fusing the first region with parallel scan lines in a third direction and the second region with parallel scan lines in a fourth direction, and fusing at least one of the scan lines in the first region in the third direction immediately before fusing at least one of the scan lines in another region in the fourth direction.

One non-limiting advantage of various embodiments of the present invention is that the manufacturing time may be decreased because the scan speed within a particular article may be increased without affecting the build temperature. This is because two adjacent scan lines for fusing a particular powder layer in a single region is interrupted by at least another scan line in another region. This means that the scan speed may be increased compared to if the adjacent scan lines were fused one after the other. Using a too high scan speed when melting two adjacent scan lines in a particular layer in a particular region may result in a too high build temperature, which may, in turn, affect the mechanical properties of the material. Improved mechanical properties may also result from the fact that the scanning direction in two subsequent layers are rotated with respect to each other removing defects which may otherwise may be amplified by using the same scanning direction for overlaying layers.

In an exemplary and non-limiting embodiment of the present invention the "another" region is the second region. This means that the scanning order in the first and a subsequent layer is the same. In another example embodiment of the present invention the another region is a third region which means that the scanning order in the first and a subsequent layer is different. An advantage of at least these embodiments is that the scanning order may be set so as to achieve the building temperature interval with as little manufacturing time as possible.

In still another example embodiment of the present invention the first and second regions are within a single three-dimensional article. This means that the single article may have cross sections which are physically separate from each other. In another example embodiment the first and second regions are provided two separate three-dimensional articles, which means that two distinct three dimensional articles are manufactured.

Still further, according to various embodiments, another advantage of the present invention is that the inventive method is applicable both when one or several three dimensional articles is manufactured.

In still another example embodiment the first and second directions are parallel. In yet another example embodiment the third and fourth directions are parallel. This means that at least two regions in the same powder layer may be fused with scan lines having the same direction. The advantage of this embodiment may be that it saves some time since the many of the settings of the energy beam are the same for the first and second regions.

In still another example embodiment according to the present invention the first and/or second direction is rotated an angle α with respect to the third and/or fourth direction, where $1° \leq \alpha \leq 179°$. The advantage of at least this embodiment is that there might be different scanning directions within a first single layer for different articles and those scanning directions may be rotated the angle α when fusing the next powder layer. The rotation angle may be different for different articles from one layer to another. This may be advantageous when the shapes of the articles to be manufactured are different so that different scanning directions for different articles with different shape may decrease the total building time.

In still another example embodiment of the present the scan lines in at least one layer of at least one three-dimensional article may be straight lines. In another example embodiment the scan lines in at least one layer of at least one three-dimensional article may be meandering. The advantage of at least this embodiment is that material properties may still further be improved by alternating straight line scanning lines with meandering scanning line for subsequent layers in the three dimensional article.

In still another example embodiment the scan lines in at least one layer of at least a first three-dimensional region are fused with a first energy beam from a first energy beam source and at least one layer of at least a second three-dimensional region is fused with a second energy beam from a second energy beam source. The advantage of at least this embodiment is that multiple energy beam sources may still decrease the manufacturing time. Another advantage is that different energy beams used for different layers in the three-dimensional article may remove defects which are amplified because of small repetitive defects coming from a single energy beam source or its deflection mechanism.

In still another example embodiment the first energy beam is emanating from a first electron beam source and the second energy beam is emanating from a first laser beam source. In another example embodiment the first energy beam is emanating from a first electron beam source and the second energy beam is emanating from a second electron beam source. In yet another example embodiment the first energy beam is emanating from a first laser beam source and the second energy beam is emanating from a second laser beam source. Using different types of energy beam sources such as a laser beam source and an electron beam source may still further improve the material characteristics of the three dimensional article since. In an example embodiment when using two energy beam source of the same type they may differ in powder output and/or maximum deflection angle. This may be used in order to tailor the material properties of the final product.

In still another example embodiment of the present invention the first and second energy beams are fusing at least the first and second three-dimensional regions simultaneously. This may be performed by actually impinging the two energy beam at exactly the same position simultaneously. Another way is to first melt scan with the first energy beam and thereafter melt at least a portion of the already fused track with the second energy beam. In yet another embodiment the first energy beam is used for finalizing a first scan line and the second energy beam is used for finalizing a second scan line, where the first and second scan lines are arranged at a predetermined distance from each other. These embodiments may further decrease the manufacturing time and/or improve the material characteristics of the final product.

In another aspect of various embodiments according to the present invention, a method is provided for forming at least one three-dimensional article through successive fusion of parts of a powder bed, which parts correspond to successive cross sections of the three-dimensional article. The method comprises the steps of: providing a model of the at least one three-dimensional article, applying a first powder layer on a work table, directing a first energy beam from a first energy beam source over the work table causing the first powder layer to fuse in first selected locations according to the corresponding model to form a first cross section of the at least one three-dimensional article, where the first energy beam is fusing a first article with parallel scan lines in a first direction, and fusing a second scan line in the first direction in the first layer in the first article within a predetermined time interval after fusing a first scan line in the first article, wherein at least one intermediate scan line is fused within the time interval at another predetermined position and where the first and second scan lines are adjacent to each other.

In at least this embodiment of the invention it is stated that the time between two adjacent scan lines in a particular article is within a predetermined time interval. This is to ensure that the build temperature is not above or below a predetermined temperature interval. Waiting too long between too adjacent scan lines may result in too much cooling of the three dimensional article resulting in a too low build temperature and a too short time between two adjacent scan lines may result in a not sufficient cooling of the three dimensional article resulting in a too high build temperature. The time period between two adjacent scan lines for a particular layer of a particular three dimensional article may be used for an intermediate scan line at another position with respect to the first and second scan lines. The advantage of this embodiment is that the manufacturing time may be reduced because the time between two adjacent scanning lines for a particular article is used for scanning elsewhere.

In an example embodiment of the present invention the intermediate scan line is within the first article. This means that the intermediate scan line is provided at another position in the same article compared to the first and second adjacent scan lines. The advantage of at least this embodiment is that the manufacturing time of a single three dimensional article may be reduced.

In an example embodiment of the present invention the intermediate scan line is provided at a predetermined distance from the first and second scan lines. This is to ensure that the build temperature of the three-dimensional article can be controlled within the temperature interval. If providing the intermediate scan line to close to any one of the first or second scan line the build temperature may be reach above the predetermined temperature interval with maintained scan speed, alternatively the scan speed has to be decreased but that may not be desirable.

In still another example embodiment the intermediate scan line is in another article. This will require a manufacturing of at least two articles at the same time. If more than two articles are manufactured the intermediate scan line may jump to any one of the other three-dimensional articles having a cross section in the same powder layer. The advantage of providing the intermediate scan line in another three dimensional article is that there may be less requirement for taking care of a distance between a former scan line in the same powder layer. In an example embodiment with a plurality of three dimensional articles one or more of the three dimensional article may be built up of a plurality of intermediate scan lines or all of its scan line being intermediate scan lines. In the example of a build with two three dimensional articles every second scan line could be provided on a first article and the rest, the intermediate scan lines, in the second article.

In still another example embodiment of the present invention the method may further comprise the steps of: applying a second powder layer on the at least partially fused first powder layer, directing the energy beam over the second powder layer causing the second powder layer to fuse in second selected locations according to a corresponding model to form a second cross section of the three dimensional article, where the energy beam is fusing the first article with parallel scan lines in a second direction, and fusing a second scan line in the second direction in the first article in the second layer within a predetermined time interval after fusing a first scan line in the first article in the second direction, wherein at least one intermediate scan lines is fused within the time interval at another predetermined position and where the first and second scan lines in the second direction are adjacent to each other.

In the second layer the scan direction has been changed in comparison with the first layer for eliminating or reducing the effects of any defects which may result if fusing two adjacent layers with the same scanning direction. As in the first layer the scanning strategy is to use the idle time between two adjacent scan lines in a particular article and layer for fusing elsewhere. Elsewhere could in an example embodiment be as in the first layer in the same article at a predetermined distance from the first and second adjacent scan lines. In another exemplary embodiment the intermediate scan line may fuse another article in the same manner as for the first layer.

In still another example embodiment of the present invention the a first scan line in at least one layer of the at least one three-dimensional article is fused with a first energy beam from a first energy beam source and a second scan line in at least one layer of the at least one three-dimensional article is fused with a second energy beam from a second energy beam source. The advantage of at least this embodiment is that the manufacturing time may be decreased and the material property may be improved.

The first and second energy beam sources may be emanating from the same type of energy beam source such as a first and second laser beam source and a first and second electron beam source or different type of energy beam sources such as a laser beam source and an electron beam source. When using the same type of energy beam source the powder output, beam characteristics, maximum deflection angle etc. may differ between the first and second source for making it possible to tailor the material properties of the three dimensional article.

According to various embodiments, the scan lines may be straight line or meandering lines and the scan lines in a first layer for a particular article may be rotated an angle α, where 1°≤α≤179°.

Herein and throughout, where an exemplary embodiment is described or an advantage thereof is identified, such are considered and intended as exemplary and non-limiting in nature, so as to not otherwise limit or constrain the scope and nature of the inventive concepts disclosed.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings:

FIG. 4 illustrates schematically a virtual move of articles in FIG. 1 according to an example embodiment of the present invention;

FIG. 5 depicts schematically a scan line order for the horizontal scan lines in the three-dimensional articles in FIG. 1 according to an example embodiment of the present invention;

FIG. 8 depicts a schematic top view of the scan lines in a first layer of two three dimensional articles; and FIG. 9 depicts a schematic top view of the scan lines in a second layer of the two three dimensional articles in FIG. 8.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of a charged particle beam can include an electron gun, a linear accelerator and so on.

Figure 3:
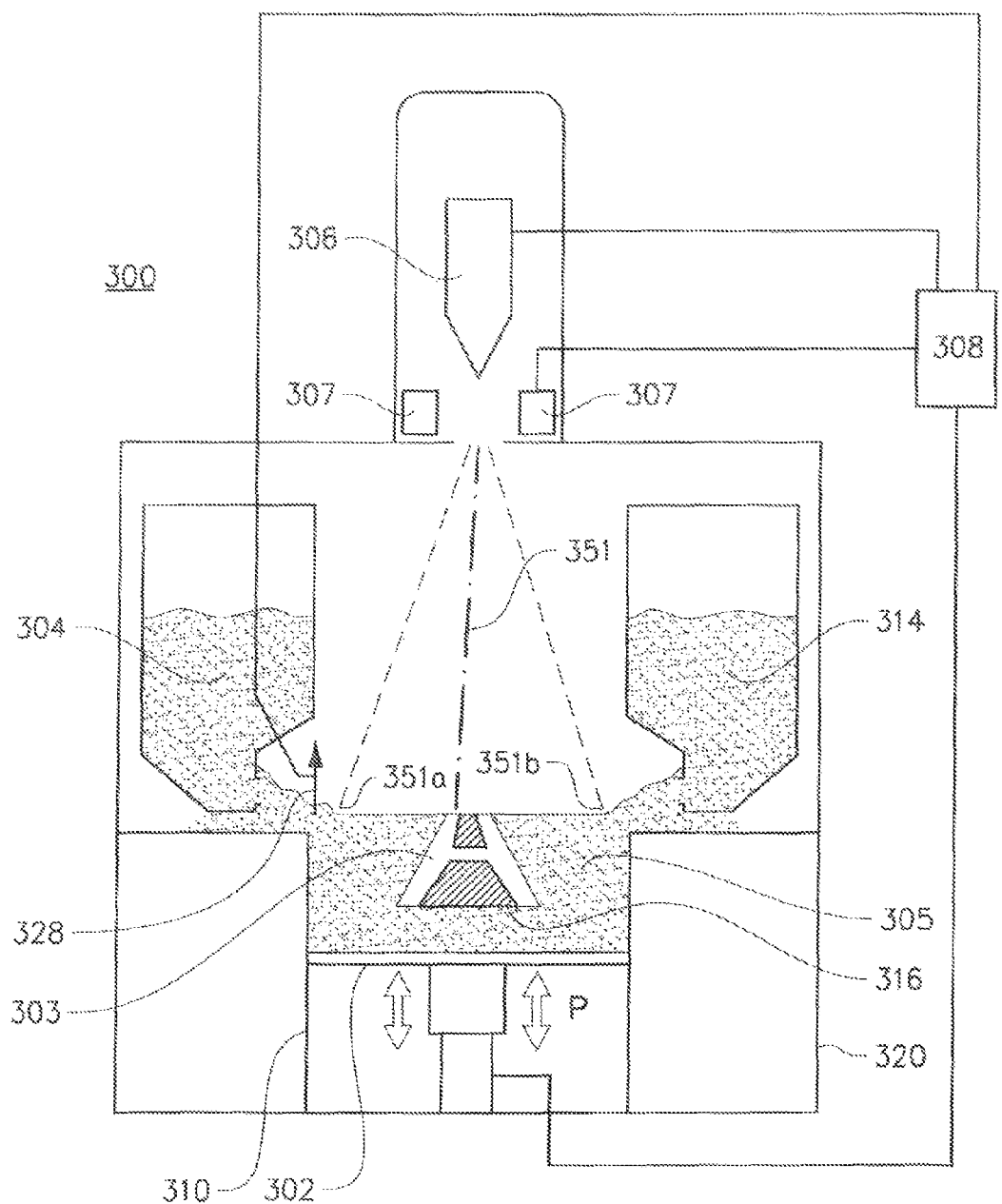
FIG. 3 depicts an apparatus in which the present invention may be implemented.

FIG. 3 depicts an example embodiment of a freeform fabrication or additive manufacturing apparatus 300 according to prior art in which the present invention may be implemented. The apparatus 300 comprises an electron source 306; two powder hoppers 304, 314; a start plate 316; a build tank 310; a powder distributor 328; a build platform 302; a vacuum chamber 320, a beam deflection unit 307 and a control unit 308. FIG. 3 discloses only one beam source for sake of simplicity. Of course, any number of beam sources may be used.

The vacuum chamber 320 is capable of maintaining a vacuum environment by means of or via a vacuum system, which system may comprise a turbomolecular pump, a scroll pump, an ion pump and one or more valves which are well known to a skilled person in the art and therefore need no further explanation in this context. The vacuum system may be controlled by the control unit 308. In another embodiment the build tank may be provided in an enclosable chamber provided with ambient air and atmosphere pressure. In still another example embodiment the build chamber may be provided in open air.

The electron beam source 306 is generating an electron beam, which may be used for melting or fusing together powder material 305 provided on the work table. At least a portion of the electron beam source 306 may be provided in the vacuum chamber 320. The control unit 308 may be used for controlling and managing the electron beam emitted from the electron beam source 306. The electron beam 351 may be deflected between at least a first extreme position 351a and at least a second extreme position 351b.

At least one focusing coil, at least one deflection coil and an electron beam power supply may be electrically connected to the control unit 308. The beam deflection unit 307 may comprise the at least one focusing coil, the at least one deflection coil and optionally at least one astigmatism coil. In an example embodiment of the invention the electron beam source may generate a focusable electron beam with an accelerating voltage of about 60 kV and with a beam power in the range of 0-3 kW. The pressure in the vacuum chamber may be in the range of $10^{-3}$-$10^{-6}$ mBar when building the three-dimensional article by fusing the powder layer by layer with the energy beam source 306.

Instead of melting the powder material with an electron beam, one or more laser beams and/or electron beams may be used. Each laser beam may normally be deflected by one or more movable mirror provided in the laser beam path between the laser beam source and the work table onto which the powder material is arranged which is to be fused by the laser beam. The control unit 308 may manage the deflection of the mirrors so as to steer the laser beam to a predetermined position on the work table.

The powder hoppers 304, 314 may comprise the powder material to be provided on the start plate 316 in the build tank 310. The powder material may for instance be pure metals or metal alloys such as titanium, titanium alloys, aluminum, aluminum alloys, stainless steel, Co—Cr—W alloy, and the like. Instead of two powder hoppers, one powder hopper may be used. Other designs and/or mechanism for of the powder supply may be used, for instance a powder tank with a height-adjustable floor.

The powder distributor 328 may be arranged to lay down a thin layer of the powder material on the start plate 316. During a work cycle the build platform 302 will be lowered successively in relation to the energy beam source after each added layer of powder material. In order to make this movement possible, the build platform 302 is in one embodiment of the invention arranged movably in vertical direction, i.e., in the direction indicated by arrow P. This means that the build platform 302 may start in an initial position, in which a first powder material layer of necessary thickness has been laid down on the start plate 316. A first layer of powder material may be thicker than the other applied layers. The reason for starting with a first layer which is thicker than the other layers is that one may not want a melt-through of the first layer onto the start plate. The build platform may thereafter be lowered in connection with laying down a new powder material layer for the formation of a new cross section of a three-dimensional article. Means for lowering the build platform 302 may for instance be through a servo engine equipped with a gear, adjusting screws, and the like.

Figure 7:
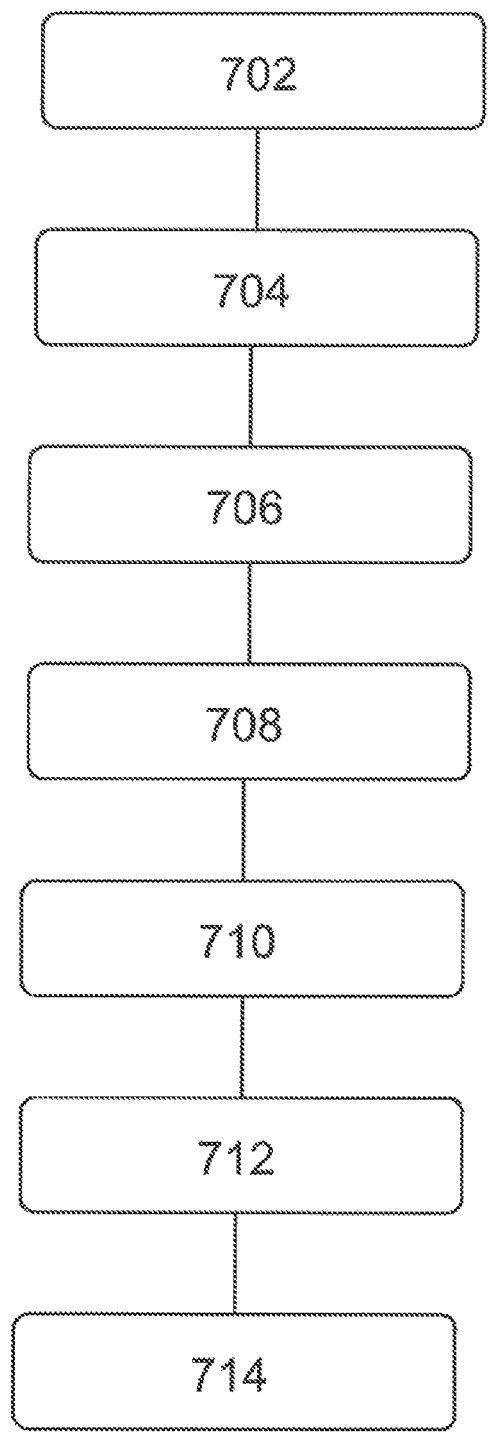
FIG. 7 depicts a schematic flowchart of an example embodiment of the method according to the present invention.

In FIG. 7 it is depicted a flow chart of an example embodiment of a method according to the present invention for forming at least two separate three-dimensional articles through successive fusion of parts of a powder bed, which parts correspond to successive cross sections of the three-dimensional article. The method comprising a first step 702 of providing models of the three dimensional articles. The models may be a computer model generated via a CAD (Computer Aided Design) tool. The three-dimensional articles which are to be built may be equal or different to each other.

In a second step 704 a first powder layer is provided on a work table. The work table may be the start plate 316, the build platform 302, a powder bed or a partially fused powder bed. The powder may be distributed evenly over the work-table according to several methods. One way to distribute the powder is to collect material fallen down from the hopper 304, 314 by a rake system. The rake or powder distributor 328 may be moved over the build tank and thereby distributing the powder over the work table.

A distance between a lower part of the rake and the upper part of the start plate or previous powder layer determines the thickness of powder distributed over the work table. The powder layer thickness can easily be adjusted by adjusting the height of the build platform 302.

In a third step 706 a first energy beam is directed from a first energy beam source over the work table causing the first powder layer to fuse in first selected locations according to corresponding models to form a first cross section of the three-dimensional articles 303.

The first energy beam may be fusing a first article with parallel scan lines in a first direction and a second article with parallel scan lines in a second direction.

The first energy beam may be an electron beam or a laser beam. The beam is directed over the work table from instructions given by the control unit 308. In the control unit 308 instructions for how to control the beam source 306 for each layer of the three-dimensional article may be stored.

Figure 1:
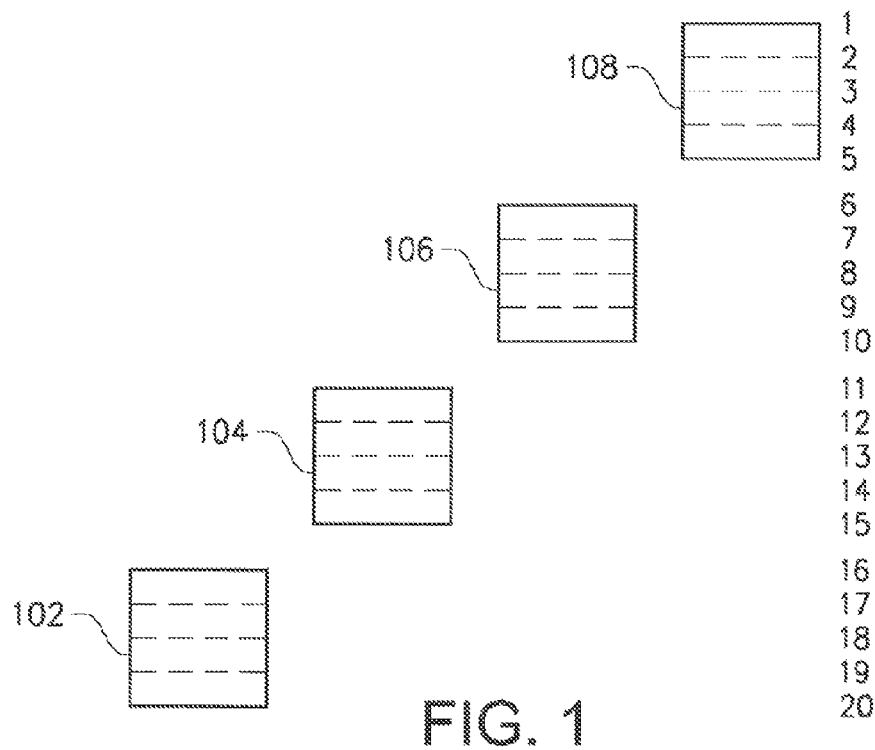
FIG. 1 depicts a prior art hatch algorithm for a single layer of four different three-dimensional articles.

In FIG. 1 it is disclosed a scan line algorithm according to prior art. In FIG. 1 four square formed articles 102, 104, 106, 108 are arranged in a slanted line, where the diagonal line in each square is parallel with the slanted line. The scan line algorithm according to prior art scans one article after the other, i.e., starting with the article 108 and completing the melting of the article before starting to melt the next article, which in FIG. 1 is article 106. Each square is illustrated to have five scan lines. Hatching four squares requires 20 scan lines in total. In an example embodiment the time it takes for a scan line to be melted is independent of its length, within a predetermined maximum length of the scan length. This means that the time it takes to melt a long scan line is equal to the time it takes to melt a short scan line. This strategy may be used for controlling the temperature of three-dimensional article which is to be manufactured. If a scan line would arrive at a previously fused area to early the surface and/or the bulk temperature of the three dimensional article may increase over a predetermined maximum temperature, which in turn may affect the microstructure, internal stress and/or tensile strength of the material.

In a fourth step 708 at least one of the scan lines in the first article is fused in the first direction immediately before fusing at least one of the scan lines in the second article in the second direction.

Figure 2:
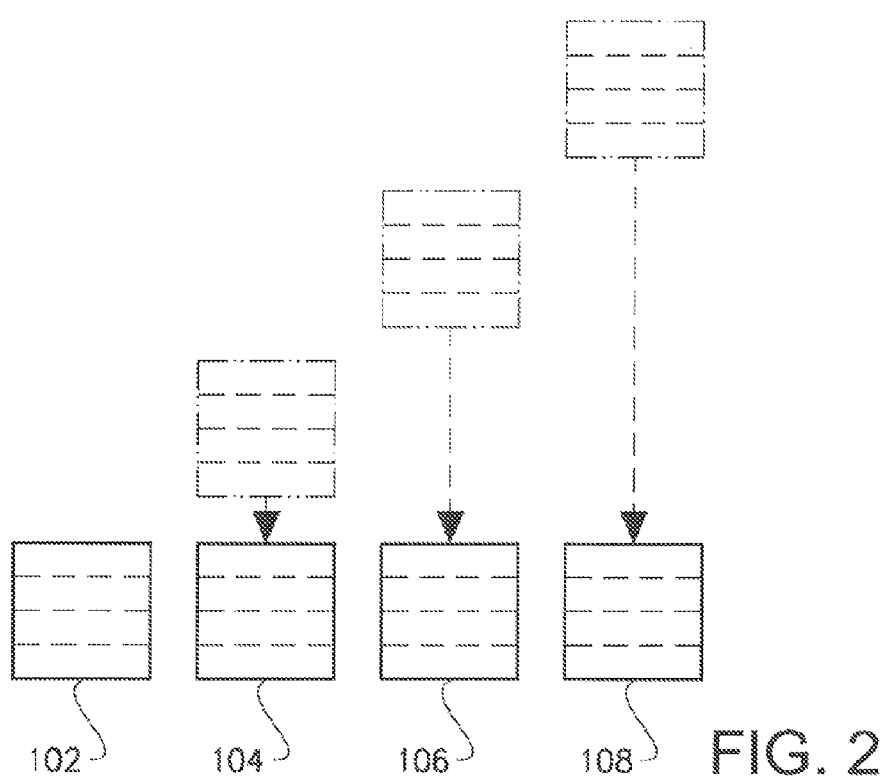
FIG. 2 illustrates schematically a virtual move of the articles in FIG. 1 according to an example embodiment of the present invention.

FIG. 2 illustrates schematically a virtual move of the articles in FIG. 1 according to an example embodiment of the present invention. The figure serves only the purpose to exemplify how the inventive method is working and is not part of the method as such. If the articles would be arranged in the way as illustrated in FIG. 2 a horizontal scan line in article 102 may directly continue in article 104, i.e., a first scan line from a first article may be merged with a first scan line in a second article. By doing so longer scan lines can be created by combining independent and physically separated regions. The scan lines in a first article, for instance article 102, may be in a first direction and scan lines in a second article, for instance article 104, may be in a second direction. In FIGS. 1 and 2 the all scan lines are illustrated to be in one and the same direction. However, different directions of scan lines may be used for different articles. The combination of a first scan line in a first article in a first direction may nevertheless be possible although the direction of the scan line in a second article is in a second direction which may be different to the first direction. In FIG. 5 it is illustrated that the number of effective scan lines is reduced from 20 to 5 by the inventive method. This means that the manufacturing speed may decrease by a factor 4 in comparison with the prior art scan line algorithm as illustrated in FIG. 1. The reduction in manufacturing time is due to the fact that the scan speed may be increased with maintained build temperature of the three dimensional article. Two consecutive scan lines for a single article and single layer may be separated by a predetermined time interval. In an example embodiment of the present inventive method other articles are scanned within the predetermined time interval. The more the scan speed is increased the more articles may be scanned within the predetermined time interval. An upper limit of the scan speed may be the power of the energy beam source. In order to melt a specific material a specific energy deposition into the material is required. When increasing the scan speed for a given energy beam spot size, the power of the energy beam is required to increase in order to deposit the same amount of energy into the material. At a certain scan speed a maximum power level of the energy beam source may be reached, i.e., the scan speed may not be increased any more without decreasing the energy deposit into the material.

In a fifth step 710 a second powder layer is applied on the already partially fused first powder layer. This may be performed in a similar manner as the first powder is applied.

In a sixth step 712 the energy beam is directed over the work table causing the second powder layer to fuse in second selected locations according to corresponding models to form a second cross section of the three dimensional articles, where the energy beam is fusing the first article with parallel scan lines in a third direction and the second article with parallel scan lines in a fourth direction.

Figure 6:
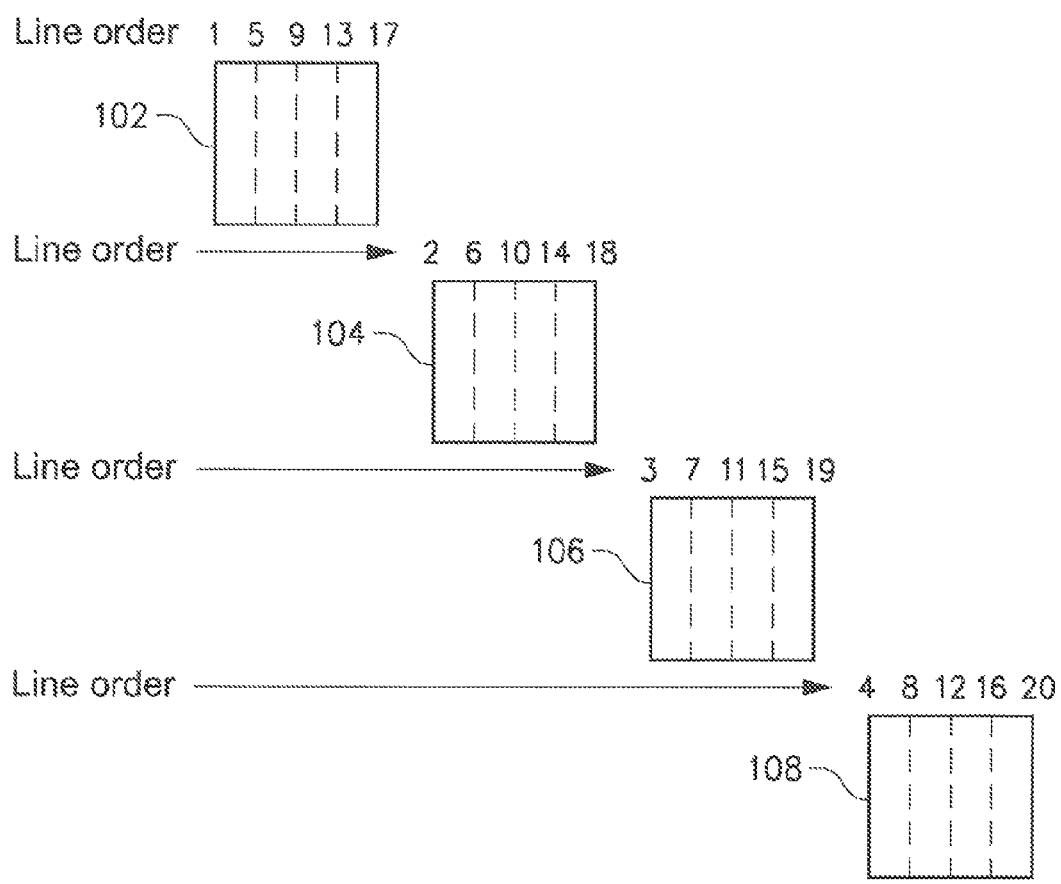
FIG. 6 depicts schematically a scan line order for the vertical scan lines in the three-dimensional articles in FIG. 1 according to an example embodiment of the present invention.

FIG. 4 illustrates schematically a virtual move and rotation of the articles in FIG. 1 according to an example embodiment of the present invention. The figure serves only the purpose to exemplify how the inventive method is working and is not part of the method as such. The articles are rotated 90° clockwise before arranging the articles in a vertical row. As in FIG. 2, the effective number of scan lines is reduced from 20 to 5 as depicted in FIG. 6, resulting in a manufacturing time reduction by a factor 4 with respect to the prior art method. In FIGS. 4 and 6 the direction of the scan lines is illustrated to be vertical for the second powder layer, i.e., the scan lines are rotated 90° with respect to the scan lines for the first powder layer. However, the scan lines for the second powder layer may be rotated by any angle α, where $1° \leq \alpha \leq 179°$. It is also depicted in FIGS. 4 and 6 that each article 102, 104, 106, 108 have scan lines in one and the same direction. In an example embodiment a first article may have a third scan direction and a second article a fourth scan direction. In another example embodiment the scan lines in at least one powder layer of at least one article may be meandering instead of the illustrated straight lines in FIGS. 1, 2, 4, 5, 6.

In a seventh step 714 at least one of the scan lines in the first article is fused in the third direction immediately before fusing at least one of the scan lines in another article in the fourth direction. In FIG. 6 it is clear that a first scan line in the first article 102 is fused immediately before a first scan line in the second article 104. However, for the first powder layer, see FIG. 5, the first scan line for the first article 102 is fused after the first scan line for the other articles 104, 106, 108. In an example embodiment the scan line order may be rearranged, e.g., the line order in FIG. 5 may start with a first scan line in article 106 or 104 instead of 108.

The "another" article may in an example embodiment be the second article; alternatively the "another" article may be a third article.

For instance if the first powder layer only comprises the four articles as illustrated in FIG. 5, one scan line of the first article may be fused immediately before the fourth article (line order 4 in article 102 and line order 5 in article 108). In the second powder layer, as illustrated in FIG. 6, none of the scan lines in the first article 102 is fused immediately before the fourth article 108, i.e., the another article is a third article in the illustrated embodiment. However, if amending the scan line order so that the fourth article 108 and the second article 104 are changing places with each other, the another article will be the same article as in the first powder layer, i.e., the fourth article.

In an example embodiment of the present invention the first and/or second scan line direction may be rotated an angle α with respect to the third and/or fourth scan line direction, so that none of the scan lines extended from the first or second three-dimensional article will intersect the other three-dimensional article. This means that the extension of the scan lines after rotation in the second powder layer is selected so that a predetermined three-dimensional article is not intersected by the extended (virtual) scan line. This may happen with a single predetermined rotation or after a predetermined number of fused layers rotated a predetermined angle.

In an example embodiment of the present invention the scan lines in at least one layer of at least a first three-dimensional article are fused with a first energy beam from a first energy beam source and at least one layer of at least a second three-dimensional article is fused with a second energy beam from a second energy beam source. More than one energy beam source may be used for fusing the scan lines. In another example embodiment a first energy beam source may be used for scanning directions within a first range of angles and a second energy beam source may be used for scanning directions within a second range of angles. The first end second ranges of angles may be overlapping or non-overlapping with each other. A first energy beam may emanate from an electron beam source and the second energy beam from a laser source. The first and second energy beam sources may be of the same type, i.e., a first and second electron beam source or a first and second laser beam source. The first and second energy beam sources may be used in sequence or simultaneously.

By using more than one energy beam source the build temperature of the three-dimensional build may more easily be maintained compared to if just one beam source is used. The reason for this is that two beam may be at more locations simultaneously than just one beam. Increasing the number of beam sources will further ease the control of the build temperature. By using a plurality of energy beam sources a first energy beam source may be used for melting the powder material and a second energy beam source may be used for heating the powder material in order to keep the build temperature within a predetermined temperature range.

After a first layer is finished, i.e., the fusion of powder material for making a first layer of the three-dimensional article, a second powder layer is provided on the work table 316. The second powder layer is in certain embodiments distributed according to the same manner as the previous layer. However, there might be other methods in the same additive manufacturing machine for distributing powder onto the work table. For instance, a first layer may be provided by means of or via a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam from the energy beam source may be directed over the work table 316 causing the second powder layer to fuse in selected locations according to the model to form second cross sections of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In another example embodiment a first scan line in a first layer in a first article in a first direction and a second scan line in the first article in the first direction is separated by N scan lines in N articles, where N is an integer 1≤N. A first scan line in a second layer in a first article in a second direction and a second scan line in the first article in the second direction is separated by N scan lines in N articles, where N is an integer 1≤N. The N articles may be the same articles in the first layer as in the second layer. In an example embodiment the N articles may be fused in a first order in the first layer and in a second order in the second layer. In another embodiment the order of fusion is equal for the N articles in the first layer and the second layer. The merging of scan lines for different articles may reduce the manufacturing time of the three dimensional articles. The order of fusing different scan lines in a predetermined layer may also depend on a heat model for the three-dimensional article, i.e., the order may not be chosen stochastically without affecting a build temperature of the article which may need to be within a predetermined temperature range.

In another example embodiment according to the present invention it is provided a method for forming at least one three-dimensional article through successive fusion of parts of a powder bed, which parts correspond to successive cross sections of the three-dimensional article, the method comprising the steps of: providing a model of the at least one three-dimensional article, applying a first powder layer on a work table, directing a first energy beam from a first energy beam source over the work table causing the first powder layer to fuse in first selected locations according to the corresponding model to form a first cross section of the at least one three-dimensional article, where the first energy beam is fusing a first article with parallel scan lines in a first direction, fusing a second scan line in the first direction in the first layer in the first article within a predetermined time interval after fusing a first scan line in the first article, wherein at least one intermediate scan line is fused within the time interval at another predetermined position and where the first and second scan lines are adjacent to each other.

In FIG. 8 it is depicted top layers of a first three dimensional article A, and a second three dimensional article B. The first three dimensional article A is scanned with horizontal scan lines 81, 82, 83, 84 and 84. The second article B is scanned with vertical scan lines 801, 802, 803 and 804. Two adjacent scan lines, for instance scan line 81 and scan line 82 in the first three dimensional article A are fused within a predetermined time interval, i.e., the second scan line 82 is fused within the predetermined time interval after fusion of the first scan line 81. Within the predetermined time interval at least one intermediate scan line may be fused at another position. This may for instance be within the first three-dimensional article or in the second three dimensional article or in any other three dimensional article if more than 2 articles is to be manufactured at the same time. If the intermediate scan line is to be fused within the first three dimensional article A, the intermediate scan line may be positioned at a predetermined distance away from the first and second scan line. If provided to close to the first and/or second scan line it may disturb the build temperature and the process may be slowed down in order to achieve the desired build temperature range. Providing the intermediate scan line at the predetermined distance away from the first and second scan lines will maintain the manufacturing speed while keeping control of the build temperature to fir within the predetermined temperature interval. In an example embodiment an intermediate scan line may be provided in another three dimensional article if the manufacturing time must be slowed down due to the fact that any position in the first article that is still unfused will be too close to the first and second scan lines. In another example embodiment the intermediate scan line is always provided in another three dimensional article compared to the first and second scan lines.

In FIG. 8 the first three-dimensional article is scanned with essentially horizontal scan lines and the second three dimensional article may be scanned with essentially vertical scan lines. In FIG. 9 it is illustrated a second powder layer which is provided on top of the partially fused first powder layer. In FIG. 9 the first three dimensional article A is scanned with essentially vertical scan lines and the second three dimensional article B is scanned with essentially horizontal scan lines. Of course, the rotation of the scan lines for the second layer may not as indicated in FIGS. 8 and 9 be rotated 90°, but may be rotated any angle α, where 1°≤α≤179°. In an example embodiment the rotation between layer one and two for the first article A may be different to the rotation of the scan lines between layer one and two for article B.

In the second layer two adjacent scan lines, for instance scan line 91 and scan line 92 in the first three dimensional article A may be fused within a predetermined time interval, i.e., the second scan line 92 may be fused within the predetermined time interval after fusion of the first scan line 91. Within the predetermined time interval at least one intermediate scan line may be fused at another position. This may for instance be within the first three-dimensional article A or in the second three dimensional article B or in any other three dimensional article if more than 2 articles is to be manufactured at the same time. If the intermediate scan line is to be fused within the first three dimensional article A, the intermediate scan line may be positioned at a predetermined distance away from the first and second scan line for the same reason as disclosed above in relation to layer one.

If the time interval mentioned above is too short the build temperature of a particular article will be too high since the second scan line will arrive adjacent to an already fused position in the particular article and thereby affect the build temperature of the article. On the other hand, if the time interval is too long, the build temperature will be too low since it will take too long time until the second scan line will arrive adjacent to the already fused position, i.e., the article has cooled down too much to maintain a predetermined build temperature interval.

In another example embodiment the energy beam is directed over the second powder layer causing the second powder layer to fuse in second selected locations according to corresponding models to form a second cross section of the three dimensional articles, where the energy beam is fusing the first article with parallel scan lines in a third direction and the second article with parallel scan lines in a fourth direction. Fusing a second scan line in the third direction in a first article in the second layer within a predetermined time interval after fusing a first scan line in the first article in the first direction, wherein at least N first scan lines in N different articles in the first direction is fused within the time interval. According to various embodiments, it should be understood that N is an integer 1≤N.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Such modifications may, for example, involve using a different source of ray gun than the exemplified electron beam such as laser beam. Other materials than metallic powder may be used such as powders of polymers and powder of ceramics. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming at least two separate three-dimensional regions through successive fusion of parts of a powder bed, which parts correspond to successive cross sections of the three-dimensional regions, said method comprising the steps of:
   providing at least one model of said three-dimensional regions;
   applying a first powder layer on a work table;
   directing a first energy beam from a first energy beam source over said work table causing said first powder layer to fuse in first selected locations according to the corresponding at least one model to form a first cross section of said three-dimensional regions, where said first energy beam is fusing a first region with parallel scan lines in a first direction and a second region with parallel scan lines in a second direction;
   fusing at least one of said scan lines in said first region in said first direction immediately before fusing at least one of said scan lines in said second region in said second direction;
   applying a second powder layer on the at least partially fused first powder layer;
   directing the first energy beam over said work table causing said second powder layer to fuse in second selected locations according to the corresponding at least one model to form a second cross section of said three-dimensional regions, where the first energy beam is fusing said first region with parallel scan lines in a third direction and said second region with parallel scan lines in a fourth direction; and
   after fusing at least one of said scan lines in said second region in said second direction, fusing at least one of said scan lines in said first region in said third direction immediately before fusing at least one of said scan lines in another region in said fourth direction,
   wherein said first and second regions are provided in two separate three-dimensional articles.

2. The method according to claim 1, wherein said another region is said second region.

3. The method according to claim 1, wherein said another region is a third region.

4. The method according to claim 3, wherein said third region is within one of said two separate three-dimensional articles.

5. The method according to claim 3, wherein said third region is provided in a third separate three-dimensional article.

6. The method according to claim 1, wherein said first and second directions are parallel.

7. The method according to claim 1, wherein said third and fourth directions are parallel.

8. The method according to claim 1, wherein at least one of said first or second directions is rotated an angle α with respect to at least one of said third or fourth directions, where $1° \leq \alpha \leq 179°$.

9. The method according to claim 1, wherein said energy beam is either an electron beam or a laser beam.

10. The method according to claim 1, wherein said powder is metallic powder.

11. The method according to claim 1, wherein the scan lines in at least one layer of at least one three-dimensional article are straight lines.

12. The method according to claim 1, wherein the scan lines in at least one layer of at least one three-dimensional region are meandering.

13. The method according to claim 1, wherein the scan lines in at least one layer of the second region are further fused with a second energy beam emanating from a second energy beam source.

14. The method according to claim 13, wherein said first energy beam source is a first electron beam source and said second energy beam source is a first laser beam source.

15. The method according to claim 13, wherein said first energy beam source is a first electron beam source and said second energy beam source is a second electron beam source.

16. The method according to claim 13, wherein said first energy beam source is a first laser beam source and said second energy beam source is a second laser beam source.

17. The method according to claim 13, wherein said first and second energy beams are fusing at least said first and second three-dimensional regions simultaneously.

18. The method according to claim 1, wherein at least one of said first or second directions is rotated a perpendicular angle with respect to at least one of said third or fourth directions.

19. The method according to claim 18, wherein said first direction is perpendicular to said third direction and said second direction is perpendicular to said fourth direction.

20. The method according to claim 1, wherein said powder is selected from a group consisting of metallic powder, polymer powder, and ceramic powder.

21. The method according to claim 1, wherein said steps are performed via a controlling computer.

* * * * *